United States Patent
Liebenow

(10) Patent No.: US 7,210,047 B2
(45) Date of Patent: Apr. 24, 2007

(54) METHOD OF SWITCHING MODES OF A COMPUTER OPERATING IN A GRID ENVIRONMENT BASED ON THE CURRENT OPERATING MODE

(75) Inventor: Frank Liebenow, Jefferson, SD (US)

(73) Assignee: Gateway Inc., Irvine, CA (US)

( * ) Notice: Subject to any disclaimer, the term of this patent is extended or adjusted under 35 U.S.C. 154(b) by 385 days.

(21) Appl. No.: 10/869,709

(22) Filed: Jun. 16, 2004

(65) Prior Publication Data

US 2006/0080567 A1    Apr. 13, 2006

(51) Int. Cl.
    *G06F 1/00* (2006.01)
(52) U.S. Cl. ............... 713/300; 713/320; 713/340
(58) Field of Classification Search ........... 713/300, 713/320, 323, 340
    See application file for complete search history.

(56) References Cited

U.S. PATENT DOCUMENTS

| | | | |
|---|---|---|---|
| 5,377,357 A * | 12/1994 | Nishigaki et al. ........... 710/303 |
| 5,608,537 A * | 3/1997 | Manabe et al. ............ 358/401 |
| 6,237,024 B1 | 5/2001 | Wollrath et al. |
| 6,314,446 B1 * | 11/2001 | Stiles ........................ 718/100 |
| 6,553,400 B1 | 4/2003 | Fukuda |
| 2004/0124247 A1* | 7/2004 | Watters ....................... 235/492 |
| 2005/0005201 A1* | 1/2005 | Yang ........................... 714/40 |
| 2005/0271376 A1* | 12/2005 | Tsuchida et al. ............ 396/205 |
| 2006/0120565 A1* | 6/2006 | Belau et al. ................. 382/107 |

OTHER PUBLICATIONS

Seti@Home—How Seti@home works—Sending you the date—http://setiathome.ssl.berkeley.edu/about_seti/about_seti_at_home_3.html.

* cited by examiner

*Primary Examiner*—Chun Cao
*Assistant Examiner*—Malcolm Cribbs
(74) *Attorney, Agent, or Firm*—Ross F. Hunt, Jr.; Stiles & Harbison PLLC

(57) ABSTRACT

A grid power mode is defined such that, when the PC is in a grid power mode, pressing the power switch of the PC retains power to the system, but restores operation of the PC to the 'on/off/standby' mode the user expects. Other aspects include: an indicator telling the user that a grid function is in progress; a reprogrammed power on/off/resume switch; and a notification protocol.

23 Claims, 2 Drawing Sheets

METHOD OF SWITCHING MODES OF A COMPUTER OPERATING IN A GRID ENVIRONMENT BASED ON THE CURRENT OPERATING MODE

BACKGROUND OF THE INVENTION

1. Field of the Invention

The present invention relates to devices, systems, and processes useful in grid computing environments, and more specifically to devices, systems, and processes useful for indicating when a computing device is operating in a grid computing mode and terminating grid computing operations.

2. Brief Description of the Related Art

In general terms, grid computing enables the virtualization of distributed computing and data resources such as processing, network bandwidth, and storage capacity to create a single system image, granting users and applications seamless access to greater capabilities than available to a single computing device alone. In a way similar to how an Internet user views a unified instance of content via the Web, a grid user essentially sees a single, large virtual computer.

A basic aspect of grid computing is that it is based on an open set of standards and protocols, e.g., Open Grid Services Architecture (OGSA) or the like, that enable communication across diverse, heterogeneous, geographically dispersed environments. With grid computing, groups of computing devices can be optimized for computing and data resources, pooling large capacity workloads, sharing such resources across networks, and enabling collaboration.

Grid computing is well known to routineers in the art, and therefore an exhaustive description of grid computing will not be given herein. According to one way of describing grid computing, all or some of a group of computers, servers, and storage are located and addressable across an enterprise are virtualized as one large computing system. Computing grids have the capacity to give access to latent computing and storage power that, at any one time, is not being used, and can therefore afford users of the grid very large gains in power, speed, and collaboration, potentially radically accelerating computationally-intensive processes. Costs can remain low, as grids can be built using existing infrastructure, helping to ensure optimal utilization of computing capabilities.

There may be several states in which a computing device, e.g., a personal computer (PC) operates. These may include ON, OFF, STANDBY, SUSPEND, HIBERNATE, and GRID. In general, for a grid computing environment to operate, there typically is a mechanism or logic implemented by which control of a PC on a network can be usurped by a network entity to do work while the PC is not being used for its primary intended purpose. For example, if a PC in a retail store is connected to a network and left ON overnight, a software element operating on the PC may respond to a grid request from the network and dispatch programs to the PC to do calculations and send the results back to the network. Similarly, if the PC is in STANDBY, SUSPEND, or HIBERNATE, the network can use a "WAKE-ON-LAN" packet or the like to bring the PC out of that state and into the ON state to perform the task. The grid computing tasks tend to be very computationally-intensive and would negatively impact performance if a user was using the PC at the same time; therefore, if a user tries to use the PC, the Grid tasks are usually aborted and are assigned to a different PC on the grid network.

Grid operations must be resilient so that a power failure, disconnect, or other disturbance will not effect the overall outcome of an application. For example, when PCs are used as grid resources during off-hours, in which they are initialized with a specialized operating environment, a problem occurs if the user of that PC decides to use it while the grid has control of the PC. If a PC is booted into a grid operation, it may appear as being off. Given current technology, pressing the power switch will not turn the PC on, as the user may expect, but essentially will turn it off and abruptly terminate the Grid operation.

There remains a need, therefore, for systems, devices, and processes that facilitate the use of computing devices, e.g., PCs, in grid computing environments while providing more information to the PC's user about the use of the PC during grid computing.

SUMMARY OF THE INVENTION

According to a first aspect of the invention, a method of providing a grid environment for a computer system, the computer system including a power control switch, includes monitoring the computer system power control switch, after said power control switch is stimulated, detecting whether said computer system is already in a first operational mode executing a grid function, if said computer system is already in said first operational mode, terminating said grid function, and booting said computer system into a second operational mode.

According to another aspect of the present invention, a system useful for providing a grid environment for a computer system, the computer system including a power control switch, includes means for monitoring the computer system power control switch, means for detecting whether said computer system is already in a first operational mode executing a grid function, after said power control switch is stimulated, means for terminating said grid function, if said computer system is already in said first operational mode, and means for booting said computer system into a second operational mode.

According to yet another aspect of the present invention, a system useful for providing a grid environment for a computer system, the computer system including a power control switch, includes logic configured to monitor the computer system power control switch, logic configured to detect whether said computer system is already in a first operational mode executing a grid function, after said power control switch is stimulated, logic configured to terminate said grid function, if said computer system is already in said first operational mode, and logic configured to boot said computer system into a second operational mode.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DETAILED DESCRIPTION OF THE PREFERRED EMBODIMENTS

Figure 1:
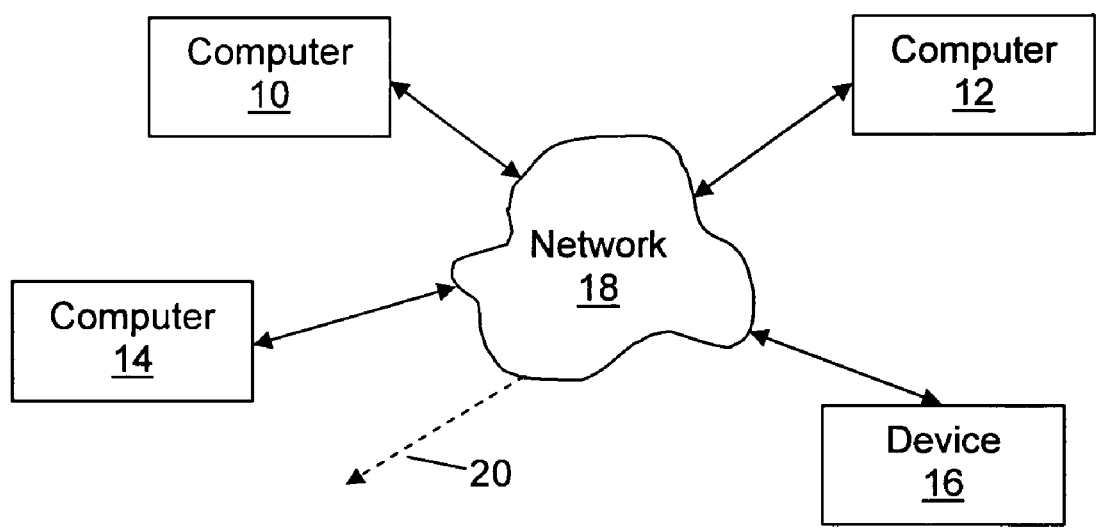
FIG. 1 illustrates a grid networking environment.

Referring to the drawing figures, like reference numerals designate identical or corresponding elements throughout the several figures.

In the context of the present invention, the numerous states in which a computing device, e.g., a PC, can be, including but not limited to ON, OFF, STANDBY, SUSPEND, or HIBERNATE, will be referred to generally as 'on/off/standby' for the sake of brevity, and a GRID mode will be referred to as such. Furthermore, while use of the term "PC" will be used throughout, the present invention extends to all computing devices capable of use in a grid computing environment, to which the term "PC" will be used to refer.

When the PC is in an 'on/off/standby' mode, the present invention does not require a change in the operation of the PC. According to the present invention, a grid power mode is defined such that, when the PC is in a grid power mode, pressing the power switch of the PC retains power to the system, but restores operation of the PC to the 'on/off/standby' mode the user expects. In general terms, the present invention includes numerous aspects, including: an indicator telling the user that a grid function is in progress; a reprogrammed power on/off/resume switch; and a notification protocol.

Exemplary embodiments of the indicator include an LED, a different color or operation (e.g., blinking pattern) of an existing LED on the PC, or a grid-mode-specific image on the PC monitor. The indicator is an optional aspect of the present invention, but can be used as an indication to the user that the PC is currently being used by the grid.

According to another aspect of the present invention, a grid mode of operation of the PC, the PC appears to be off, or in standby, yet the processor, memory and other functions are fully functional. In the grid mode, the monitor may be off, graphics card may be off (unless it is or can be utilized by the grid tasks), keyboard and mouse may be off or disabled, and other subcomponents or systems of the PC can be disabled that do not contribute to the use of the PC in grid mode. This aspect of the present invention gives the appearance to the user that the PC is off and needs to be turned on before they can use it. If the PC is actually on, in grid-mode, and running grid tasks, and the user presses the PC's on/off switch, the grid-mode will turn off. Those of ordinary skill in the art appreciate that the on/off switch in current PC technology doesn't trigger the power supply when the PC is in any of its "on" states, but instead interrupts the operating system and initiates a process to change the state of the PC to another of the 'on/off/standby' modes.

Turning now to the drawing figures, FIG. 1 illustrates a typical grid computing environment. One or more computing devices 10, 12, 14, and optionally other devices 16, such as mass storage devices, printers, and the like, are in communication with each other via a network 18. As well understood by those of ordinary skill in the art, the network 18 operates by appropriately configured logic to operate as a grid computing environment, and can be in communication with numerous additional computing devices and devices, as schematically indicated in FIG. 1 with a broken line 20.

Figure 2:
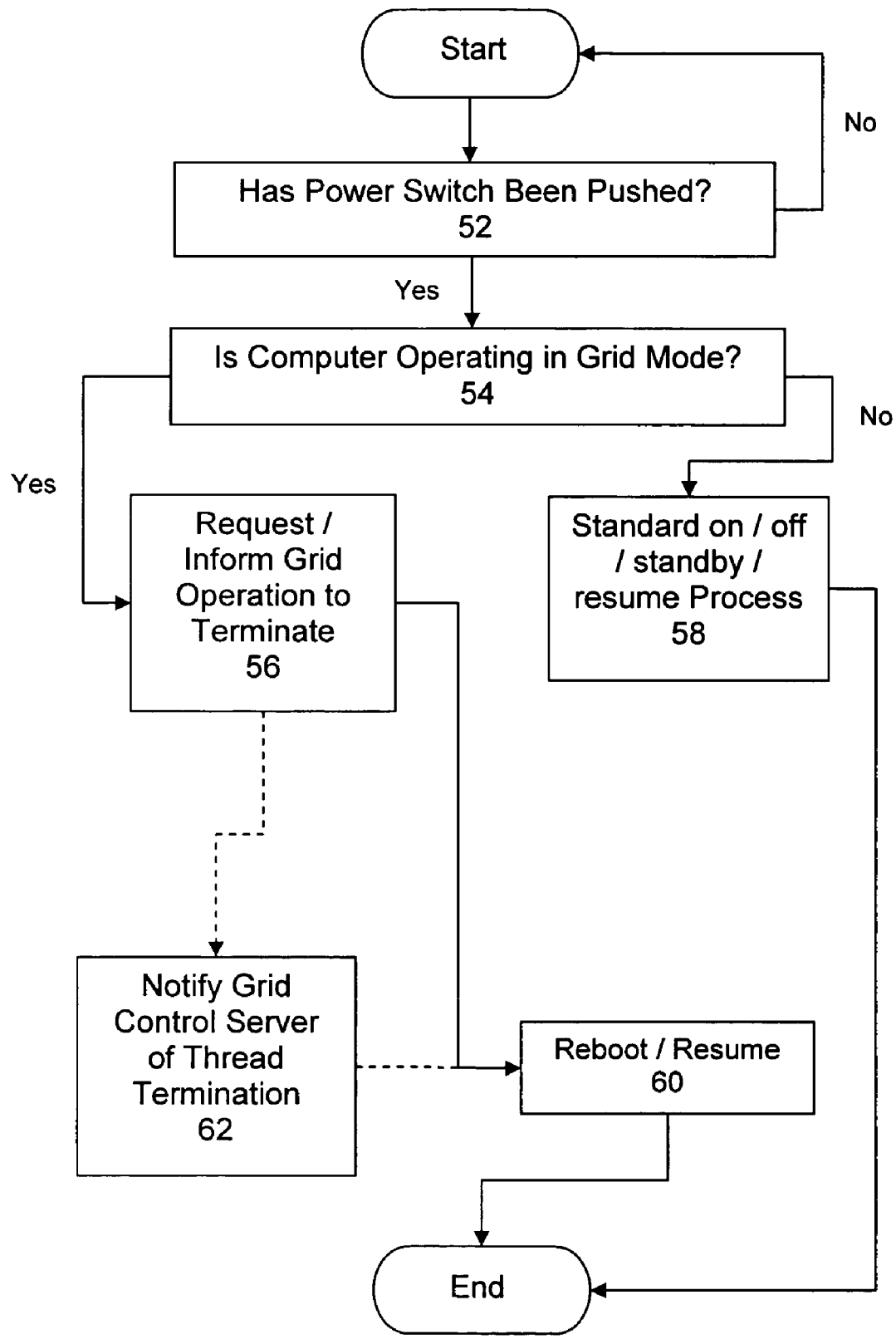
FIG. 2 illustrates a first exemplary embodiment of a process in accordance with the present invention.

FIG. 2 schematically illustrates an exemplary embodiment of a process in accordance with the present invention. The functions and operations of processes in accordance with the present invention are implemented by logic (software or firmware) in one or more memories, or logic embodied in hardware, in the PC and/or other computing devices on network 18. The process polls the power switch of the PC (52) to determine if it has been stimulated or pushed; if not, the process recycles. If the power switch has been pushed, it is determined (54) whether or not the PC is operating in a GRID mode, i.e., in communication with the network 18 and performing one or more grid tasks. If yes, then the particular grid operation that the PC is performing is terminated (56), and the PC is then rebooted or caused to resume (60) the power status ('on/off/standby') that logically follows the power status that the PC was in prior to entering the GRID mode. Alternately, instead of polling the power switch, the power switch may be configured to interrupt the processor.

If the PC was not operating in GRID mode (54), then the pressing of the power switch is interpreted in the standard or typical manner by initiating a typical process of changing the mode of the PC to another of the 'on/off/standby' modes.

A further optional aspect of the present invention includes that the process schematically illustrated in FIG. 2 can also notify the grid control server (a part of the grid logic connected to network 18) that the grid process or thread(s) that the PC was operating on in GRID mode has been terminated (62). Further optionally, the process can transmit any intermediate results of the prematurely terminated grid operation to the grid control server. Thereafter, the PC can be rebooted or another mode otherwise resumed (60).

Figure 3:
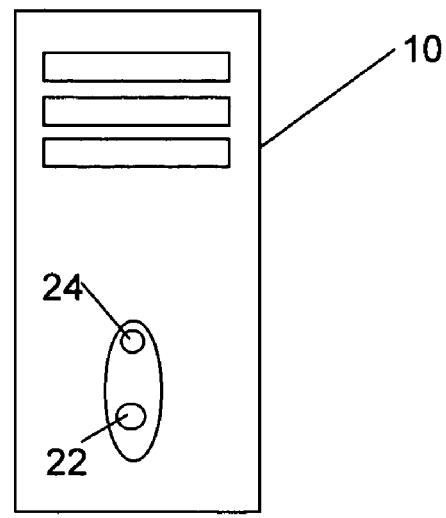
FIG. 3 illustrates a front elevational view of a desktop PC incorporating aspects of the present invention.

FIG. 3 illustrates yet another aspect of the present invention. A PC 10 (here illustrated as a tower PC, but laptops, notebooks, and other computing devices are also within the scope of the present invention) includes a power switch 22 and one or more lights or LEDs 24. According to an optional aspect of the present invention, an indicator, of which LED 24 is an exemplary embodiment, is operated so that it gives a visually distinct presentation when in the GRID mode, different from the presentation when in one of the other on/off/standby modes. By way of example and not of limitation, the LED 24 can be made to flash in a distinctive pattern, be lit in a distinctive color, or both, when in the GRID mode, different when in any of the on/off/standby modes.

One exemplary implementation of a grid computing mode in accordance with the present invention includes:

1. When the user leaves their PC for an extended period of time, e.g., the night, the user places the PC in a Hibernate state;

2. At some time, e.g., by a predefined schedule, a grid control program running on the grid network sends a 'wake-into-grid-mode' packet to the PC.

3. The PC powers up, runs a power-on-system-test ("POST"), and recognizes that this boot is a Grid boot, as opposed to a 'Resume' from the Hibernate state or some other boot between different operating modes. While the recognition by the PC of the boot-type as a grid boot can be accomplished by numerous ways within the present invention, one non-limiting example includes a hardware register that has a bit set to indicate that a 'wake-into-grid-mode' packet was received by the PC.

4. Instead of 'resuming' from Hibernate, the PC may optionally boot in a different manner, e.g., boot from another portion of the hard drive, e.g., a hidden partition. Yet further optionally, the grid-boot may boot with a different operating system, Such as Linux or one of its implementations. The monitor and graphics card of the PC may optionally not be used in the grid mode, and therefore they may optionally be left off, possibly saving electricity, reducing waste heat and booting faster. The PC sets a flag or otherwise includes data indicating that the PC is operating in a gird mode.

5. Once initialized, the PC appears to a user to be 'off'. According to another aspect of the present invention, the PC can display a different LED presentation to indicate that it is running a grid application. The PC now receives grid tasks from the network 18, performs the task(s), and sends results back onto the network.

6. When the user decides to use the PC, the PC will appear as if it is off or hibernated, and the user will press the power button, which will interrupt the operating system or BIOS. Because the PC has set flags or otherwise includes data indicating that the PC is in GRID mode, the operating system or BIOS will terminate all running grid tasks. According to yet another aspect of the present invention, the PC can optionally notify the grid control system of the change in availability of the PC to the grid computing network, and further optionally can forward partial results to the Grid control program. Thereafter, the PC will initiate a reboot.

7. After POST runs from the reboot, BIOS will see that the Hibernate flag was previously set, before the PC was used in grid mode, and will reload the operating system and applications that were running before step 1 above, giving the user the appearance that the PC is merely resuming operation from the hibernate state in which the PC was left before the grid system began utilizing the PC's resources.

As described above, the present invention preferably includes a power on/off/resume switch and logic that detects that the system is operating in the Grid mode, then operating in a logical fashion, including requesting the Grid operation to shut down, waiting an amount of time for the Grid operation to shut down, and then rebooting the PC or resuming the PC, depending upon whatever state the PC was placed into at the last shutdown. The reboot operation will also provide power to subsystems that were not in use by the grid operation, such as graphics, display, modem, etc.

The notification protocol (62) may include a packet from the Grid operation logic running on the PC and sent to the Grid control server, warning that the PC will abort the Current thread due to operator intervention. Such notification will allow the grid control server to gracefully reassign the grid operation to another PC on the grid.

According to yet another optional aspect of the present invention, recognizing that it may take a short time, e.g., a few seconds, to terminate the grid application when the power switch 22 is stimulated, systems and processes in accordance with the present invention can be provided with logic configured to provide a message on a display connected to the PC and/or generate a unique sound, informing the operator that the system is booting, once the power switch has been pressed. In this manner, the user gets a quick response to pressing the power switch and may be less likely to press the switch multiple times. The message can be exactly what the user would see if the PC was in an off state and they pressed the power button, or can be another message more specific to the trans-mode process that the PC is undergoing.

While the invention has been described in detail with reference to preferred embodiments thereof, it will be apparent to one skilled in the art that various changes can be made, and equivalents employed, without departing from the scope of the invention.

What is claimed is:

1. A method of providing a grid environment for a computer system, the computer system including a power control switch, the method comprising:
   monitoring the computer system power control switch; after said power control switch is stimulated, detecting whether said computer system is already in a first operational mode executing a grid function; if said computer system is already in said first operational mode, terminating said grid function; and booting said computer system into a second operational mode.

2. A method of providing a grid environment for a computer system according to claim 1, further comprising: notifying a central grid server that said grid function has been shut down.

3. A method of providing a grid environment for a computer system according to claim 1, wherein said booting comprises restarting a user environment.

4. A method of providing a grid environment for a computer system according to claim 1, wherein said booting comprises restoring a user environment that was saved when said computer system was last shut down.

5. A method of providing a grid environment for a computer system according to claim 1, further comprising:
   operating a lamp to provide a visually distinct presentation that said computer system is in said first operational mode.

6. A method of providing a grid environment for a computer system according to claim 1, further comprising: providing a message on a display connected to said computer system, said message indicating that the computer system is booting.

7. A system useful for providing a grid environment for a computer system, the computer system including a power control switch, the system comprising: means for monitoring the computer system power control switch; means for detecting whether said computer system is already in a first operational mode executing a grid function, after said power control switch is stimulated; means for terminating said grid function, if said computer system is already in said first operational mode; and means for booting said computer system into a second operational mode.

8. A system according to claim 7, further comprising: means for notifying a central grid server that said grid function has been shut down.

9. A system according to claim 7, wherein said means for booting comprises means for restarting a user environment.

10. A system according to claim 7, wherein said means for booting comprises means for restoring a user environment that was saved when said computer system was last shut down.

11. A system according to claim 7, further comprising:
    means for operating a lamp to provide a visually distinct presentation that said computer system is in said first operational mode.

12. A system according to claim 7, wherein said computer system includes a display connected to said computer system, and further comprising: means for providing a message on said display, said message indicating that the computer system is booting.

13. A system useful for providing a grid environment for a computer system, the computer system including a power control switch, the system comprising:
    logic configured to monitor the computer system power control switch; logic configured to detect whether said computer system is already in a first operational mode executing a grid function, after said power control switch is stimulated; logic configured to terminate said grid function, if said computer system is already in said first operational mode; and logic configured to boot said computer system into a second operational mode.

14. A system according to claim 13, further comprising: logic configured to notify a central grid server that said grid function has been shut down.

15. A system according to claim 13, wherein said logic configured to boot comprises logic configured to restart a user environment.

16. A system according to claim 13, wherein said logic configured to boot comprises logic configured to restore a user environment that was saved when said computer system was last shut down.

17. A system according to claim 13, further comprising:
logic configured to operate a lamp to provide a visually distinct presentation that said computer system is in said first operational mode.

18. A system according to claim 13, wherein said computer system includes a display connected to said computer system, and further comprising: logic configured to provide a message on said display, said message indicating that the computer system is booting.

19. A method of operating a PC in a grid computing network, said PC having a power button, said method comprising: running an operating system and applications in a non-grid mode; entering a hibernate state and setting a hibernate flag in response to receiving a command to enter said hibernate state; booting into a grid mode and setting a grid mode flag in response to receiving a wake-into-grid-mode packet; and in response to a user pressing said power button: determining that the grid mode flag is set and terminating all running grid tasks; determining that the hibernate flag is set, booting into said non-grid mode, and reloading said operating system and applications that were running in said non-grid mode so as to present to the user the appearance that the PC is merely resuming operation from the hibernate state in which the PC was left before the PC booted into grid mode.

20. The method of operating a PC in a grid computing network of claim 19, wherein said PC further includes an indicator lamp, the method further comprising:
operating said indicator lamp to provide a visually distinct presentation when in grid mode.

21. The method of operating a PC in a grid computing network of claim 19, further comprising, in response to a user pressing said power button and determining that the grid mode flag is set: notifying a grid control system of the change in availability of the PC to said grid computing network; and forwarding partial results to said grid control system.

22. The method of operating a PC in a grid computing network of claim 19, further comprising, in response to a user pressing said power button: providing a message on a display connected to the PC informing the user that the system is booting so as to deter the user from pressing said power button multiple times while waiting for the grid tasks to terminate and the PC to boot into non-grid mode.

23. The method of operating a PC in a grid computing network of claim 19, further comprising, in response to a user pressing said power button: generating a unique sound informing the user that the system is booting so as to deter the user from pressing said power button multiple times while waiting for the grid tasks to terminate and the PC to boot into non-grid mode.

* * * * *